United States Patent
Watanabe et al.

(10) Patent No.: US 8,048,490 B2
(45) Date of Patent: Nov. 1, 2011

(54) CARBON NANOTUBE COMPOSITE STRUCTURE AND METHOD OF MANUFACTURING THE SAME

(75) Inventors: Miho Watanabe, Nakai-machi (JP); Chikara Manabe, Nakai-machi (JP); Taishi Shigematsu, Nakai-machi (JP); Kazunori Anazawa, Nakai-machi (JP); Takashi Isozaki, Nakai-machi (JP); Kentaro Kishi, Nakai-machi (JP); Masaki Hirakata, Nakai-machi (JP); Shigeki Ooma, Nakai-machi (JP); Shinsuke Okada, Nakai-machi (JP); Hiroyuki Watanabe, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 246 days.

(21) Appl. No.: 12/379,417

(22) Filed: Feb. 20, 2009

(65) Prior Publication Data

US 2009/0197002 A1    Aug. 6, 2009

Related U.S. Application Data

(62) Division of application No. 10/771,429, filed on Feb. 5, 2004, now abandoned.

(30) Foreign Application Priority Data

Sep. 26, 2003   (JP) .................................. 2003-335514

(51) Int. Cl.
    *B05D 1/38*   (2006.01)
(52) U.S. Cl. ...................... 427/402; 427/372.3; 427/384
(58) Field of Classification Search .............. 427/372.2, 427/385.5; 977/742
    See application file for complete search history.

(56) References Cited

U.S. PATENT DOCUMENTS

| 5,866,434 | A  | * | 2/1999  | Massey et al. ............... 436/526 |
| 6,183,714 | B1 |   | 2/2001  | Smalley et al. |
| 6,426,134 | B1 |   | 7/2002  | Lavin et al. |
| 2002/0172639 | A1 |   | 11/2002 | Horiuchi et al. |
| 2003/0001141 | A1 |   | 1/2003  | Sun et al. |
| 2003/0228467 | A1 | * | 12/2003 | Liebau et al. ................. 428/408 |
| 2005/0284337 | A1 | * | 12/2005 | Shigematsu et al. .......... 106/476 |
| 2006/0041050 | A1 | * | 2/2006  | Manane et al. ............... 524/496 |

FOREIGN PATENT DOCUMENTS

| JP | A-2002-346996 | 12/2002 |
| JP | A-2003-505332 | 2/2003 |
| WO | WO 97/32571 | 9/1997 |
| WO | WO 01/07694 A1 | 2/2001 |

OTHER PUBLICATIONS

Cassell, Alan M. et al. "Directed Growth of Free-Standing Single-Walled Carbon Nanotubes" *J. Am. Chem. Soc.* vol. 121, 1999 (pp. 7975-7976). Snow, E. S. et al. "Random Networks of Carbon Nanotubes as an Electronic Material." *Applied Physics Letters* vol. 82, No. 13. 2003, (pp. 2145-2147).

Apr. 7, 2009 Japanese Office Action issued in Japanese Patent Application No. 2003-335514 (translation only).

* cited by examiner

*Primary Examiner* — Erma Cameron
(74) *Attorney, Agent, or Firm* — Oliff & Berridge, PLC

(57) ABSTRACT

Provided are a carbon nanotube structure more excellent in electric conductivity, thermal conductivity, and mechanical strength, and a method of manufacturing the carbon nanotube structure. A carbon nanotube composite structure is characterized by including: a first carbon nanotube structure in which functional groups bonded to plural carbon nanotubes are chemically bonded and mutually cross-linked to construct a network structure; and a second carbon nanotube structure in which functional groups bonded to plural carbon nanotubes are chemically bonded and mutually cross-linked to construct a network structure, the second carbon nanotube structure being combined with the network structure of the first carbon nanotube structure.

27 Claims, 5 Drawing Sheets

REACTION SCHEME FOR INTRODUCING CARBOXYL GROUP INTO CARBON NANOTUBE

REACTION SCHEME FOR METHYL ESTERIFICATION OF CARBON NANOTUBE CARBOXYLIC ACID

REACTION SCHEME FOR POLYMERIZATION OF CARBON NANOTUBE CARBOXYLIC ACID METHYL ESTER AND GLYCERIN BY ESTER EXCHANGE

CARBON NANOTUBE COMPOSITE STRUCTURE AND METHOD OF MANUFACTURING THE SAME

This is a Division of application Ser. No. 10/771,429 filed Feb. 5, 2004, which claims priority to Japanese Patent Application No. 2003-335514 filed Sep. 26, 2003. The disclosure of the prior applications are hereby incorporated by reference herein in their entirety.

FIELD OF THE INVENTION AND RELATED ART STATEMENT

The present invention relates to a carbon nanotube structure and a method of manufacturing the same.

Carbon nanotubes (CNTs), with their unique shapes and characteristics, are being considered for various applications. A carbon nanotube has a tubular shape of one-dimensional nature which is obtained by rolling one or more graphene sheets composed of six-membered rings of carbon atoms into a tube. A carbon nanotube which is formed from one graphene sheet is called a single-wall nanotube (SWNT) while a carbon ranotube which is formed from plural graphene sheets is called a multi-wall nanotube (MWNT). SWNTs are about 1 nm in diameter whereas multi-wall carbon nanotubes measure several tens nm in diameter, and both are far thinner than their predecessors, which are called carbon fibers.

One of the characteristics of carbon nanotubes resides in that the aspect ratio of length to diameter is very large since the length of carbon nanotubes is on the order of micrometers. Carbon nanotubes are unique in their extremely rare nature of being both metallic and semiconductive because six-membered rings of carbon atoms in carbon nanotubes are arranged into a spiral. In addition, the electric conductivity of carbon nanotubes is very high and allows a current flow at a current density of $100 \text{ MA/cm}^2$ or more.

Carbon nanotubes excel not only in electrical characteristics but also in mechanical characteristics. That is, the carbon nanotubes are distinctively tough, as attested by their Young's moduli exceeding 1 TPa, which belies their extreme lightness resulting from being formed solely of carbon atoms. In addition, the carbon nanotubes have high elasticity and resiliency resulting from their cage structure. Having such various and excellent characteristics, carbon nanotubes are very appealing as industrial materials.

Applied researches that exploit the excellent characteristics of carbon nanotubes have been heretofore made extensively. To give a few examples, a carbon nanotube is added as a resin reinforcer or as a conductive carbon nanotube structure while another research utilizes a carbon nanotube as a probe of a scanning probe microscope. Carbon nanotubes have also been utilized as minute electron sources, field emission electronic devices, and flat displays. An application that is being developed is to use a carbon nanotube as a hydrogen storage.

However, it is extremely difficult to actually arrange carbon nanotubes. Several techniques for wiring carbon nanotubes have been currently attempted.

A first technique includes: picking up one or several carbon nanotubes by using a manipulator in a scanning electron microscope; and arranging the one or several carbon nanotubes at a desired position. A technique for arranging carbon nanotubes by using a probe microscope may be given as an example of a modification of the first technique. However, the technique requires much time and labor. Therefore, the technique is suitable for fundamental studies but is not practical.

A second technique is a technique for orienting a carbon nanotube in a certain direction by using electrophoresis. With this technique, carbon nanotubes may be wired in one direction, but it is difficult to wire carbon nanotubes in multiple directions. Thus, this technique is not realistic.

A third technique is a technique employing a chemical vapor deposition (CVD) method. The CVD method includes: using an acetylene gas or methane gas containing carbon as a raw material; and producing a carbon nanotube by a chemical decomposition reaction of the raw material gas.

Cassell, N. Franklin, T. Tombler, E. Chan, J. Han, H. Dai, J. Am. Chem. Soc. 121, 7975-7976 (1999) discloses a method of wiring a carbon nanotube horizontally to a substrate. That is, disclosed is a technique including: fabricating an Si pillar on a substrate; mounting an additive on the top part of the pillar; and allowing a methane gas to flow to bridge a carbon nanotube between pillars. The method by this technique has certainly enabled horizontal wiring. However, the probability of cross-link is extremely low, and wiring at an arbitrary position is still difficult.

As described above, a technique for wiring one or several carbon nanotubes is still at a developmental stage.

In the meantime, a method for wiring or patterning using a carbon nanotube as a film has been developed. For example, pattern formation of a carbon nanotube has been heretofore performed by using a screen printing method or a photolithography technique. Each of those techniques is excellent in forming a pattern in a wide area at once, and is used for patterning of an electron source in a field emission type display (FED). However, in each of those methods, a carbon nanotube is merely dispersed in a solvent before application, or is mixed with a binder before application. Therefore, the carbon nanotube is insufficient in terms of performance such as a mechanical strength or electric conductivity, and is hardly used directly as an electrode or an electric circuit.

JP 2002-503204 A discloses that a carbon nanotube with a three-dimensional structure can be formed by using a functionalized carbon nanotube. However, this publication discloses that, for simple use in a chromatography-flow cell electrode, a product obtained by depositing onto a metal mesh a carbon nanotube to which a functional group that is porous and serves to separate and suck a passing substance has been bonded is made porous, or carbon nanotubes are bonded to each other by using an alkoxide of aluminum or silica (the alkoxide itself serves as an insulator) as a cross-linking agent.

SUMMARY OF THE INVENTION

However, alkoxides cross-link each other, so that, in the resultant carbon nanotube structure, alkoxide residues with several tens of cross-linked sites randomly form a chain, and a distance between carbon nanotubes and a chemical structure of a carbon nanotube vary at each cross-linked site. Therefore, it becomes difficult to obtain intended characteristics of the resultant carbon nanotube structure, which places limitations on the use of the resultant carbon nanotube structure in various applications. In addition, a network structure of carbon nanotubes is not formed sufficiently densely, so that there arises a problem in that excellent characteristics including electric conductivity, thermal conductivity, and a mechanical strength which a carbon nanotube intrinsically has can not be sufficiently utilized.

The present invention has been made in view of the above circumstances and provides a novel carbon nanotube structure excellent in electric conductivity, thermal conductivity, and mechanical strength, and a method of manufacturing the carbon nanotube structure.

In order to solve the above problems, a carbon nanotube composite structure according to the present invention is characterized by including: a first carbon nanotube structure in which functional groups bonded to plural carbon nanotubes are chemically bonded and mutually cross-linked to construct a network structure; and a second carbon nanotube structure in which functional groups bonded to plural carbon nanotubes are chemically bonded and mutually cross-linked to construct a network structure, the second carbon nanotube structure being combined with the network structure of the first carbon nanotube structure.

In the carbon nanotube composite structure according to the present invention, the second carbon nanotube structure is combined with the network structure of the first carbon nanotube structure. The combination enables the second carbon nanotube structure to penetrate into a gap between nanotubes in the network structure of the first carbon nanotube structure, and enables the density of a carbon nanotube structure to increase.

As a result, a tougher carbon nanotube structure can be obtained, and thermal or electric (carrier) conductivity can be improved.

The composite structure in the present invention refers to a state where the first carbon nanotube structure and the second carbon nanotube structure are integrated into one unit. The first carbon nanotube structure and the second carbon nanotube structure may be complicatedly entangled with each other to be integrated into one unit. Alternatively, carbon nanotubes constituting the first and second carbon nanotube structures may cross-link each other.

Furthermore, in the carbon nanotube composite structure according to the present invention, if an average diameter of the carbon nanotubes constituting the first carbon nanotube structure is different from an average diameter of the carbon nanotubes constituting the second carbon nanotube structure, densities of carbon nanotubes can be further increased when the first carbon nanotube structure and the second carbon nanotube structure are combined with each other. Moreover, if the carbon nanotubes constituting the first carbon nanotube structure are formed mainly of multi-wall carbon nanotubes and the carbon nanotubes constituting the second carbon nanotube structure are formed mainly of single-wall carbon nanotubes, large network structure gaps formed in the first carbon nanotube structure are filled with the single-wall carbon nanotubes constituting the second carbon nanotube structure. As a result, the density of the carbon nanotube composite structure can be increased, and the mechanical strength and electric conductivity of the carbon nanotube composite structure are expected to increase.

The first and/or second carbon nanotube structures are preferably formed by curing a solution containing plural carbon nanotubes to which functional groups are bonded to thereby chemically bond together the plural functional groups bonded to the carbon nanotubes to form a cross-linked site.

Of those, a first structure preferable as the cross-linked site is a structure obtained by cross-linking together the plural functional groups with a cross-linking agent in the solution. More preferably, the cross-linking agent is not self-polymerizable.

If the carbon nanotube structure is formed by curing a solution as described above, the cross-linked site in which the carbon nanotubes cross-link each other can form a cross-linked structure in which residues of the functional groups remaining after the cross-linking reaction are connected to each other with a connecting group that is a residue remaining after the cross-linking reaction of the cross-linking agent.

If the cross-linking agent has a property of polymerizing with other cross-linking agents (self-polymerizability), the connecting group contains a polymer in which two or more cross-linking agents are connected to each other in some cases. In such cases, a substantial density of the carbon nanotubes in the carbon nanotube structure decreases, and sufficient electric conductivity and mechanical strength may not be obtained.

On the other hand, if the cross-linking agent is not self-polymerizable, a gap between each of the carbon nanotubes can be controlled to a size of a cross-linking agent residue used. Therefore, a desired network structure of carbon nanotubes can be obtained with high duplicability. Further, reducing the size of the cross-linking agent residue can extremely narrow a gap between each of the carbon nanotubes both electrically and physically. In addition, carbon nanotubes in the structure can be densely structured.

Therefore, if the cross-linking agent is not self-polymerizable, the carbon nanotube structure of the present invention can exhibit inherent electrical characteristics or mechanical characteristics of the carbon nanotubes in an extremely high level. In the present invention, the term "self-polymerizable" refers to a property of which the cross-linking agents may prompt a polymerization reaction with each other in the presence of other components such as water or in the absence of other components. On the other hand, the term "not self-polymerizable" means that the cross-linking agent has no such a property.

If a cross-linking agent which is not self-polymerizable is selected as the cross-linking agent, a cross-linked site, where carbon nanotubes in the carbon nanotube composite structure of the present invention are mutually cross-linked, has primarily an identical cross-linking structure. Furthermore, the connecting group preferably employs a hydrocarbon as its skeleton, and the number of carbon atoms of the skeleton is preferably 2 to 10. Reducing the number of carbon atoms can shorten the length of a cross-linked site and sufficiently narrow a gap between carbon nanotubes as compared to the length of a carbon nanotube itself. As a result, a carbon nanotube structure of a network structure composed substantially only of carbon nanotubes can be obtained.

Examples of the functional group include —OH, —COOH, —COOR (where R represents a substituted or unsubstituted hydrocarbon group), —COX (where X represents a halogen atom), —NH$_2$, and —NCO. A selection of at least one functional group selected from the group consisting of the above functional groups is preferable, and in such a case, a cross-linking agent, which may prompt a cross-linking reaction with the selected functional group, is selected as the cross-linking agent.

Further, examples of the preferable cross-linking agent include a polyol, a polyamine, a polycarboxylic acid, a polycarboxylate, a polycarboxylic acid halide, a polycarbodiimide, and a polyisocyanate. A selection of at least one cross-linking agent selected from the group consisting of the above cross-linking agents is preferable, and in such a case, a functional group, which may prompt a cross-linking reaction with the selected cross-linking agent, is selected as the functional group.

At least one functional group and one cross-linking agent are preferably selected respectively from the group exemplified as the preferable functional group and the group exemplified as the preferable cross-linking agent, so that a combination of the functional group and the cross-linking agent may prompt a cross-linking reaction with each other.

Examples of the particularly preferable functional group include —COOR (where R represents a substituted or unsubstituted hydrocarbon group). Introduction of a carboxyl group into carbon nanotubes is relatively easy, and the resultant substance (a carbon nanotube carboxylic acid) is highly reactive. Therefore, after the formation of the substance, it is relatively easy to esterify the substance to convert its functional group into —COOR (where R represents a substituted or unsubstituted hydrocarbon group), and such a functional group easily prompts a cross-linking reaction and is suitable for formation of a structure.

A polyol can be exemplified as the cross-linking agent corresponding to the functional group. A polyol is cured by a reaction with —COOR (where R represents a substituted or unsubstituted hydrocarbon group), and forms a robust cross-linked substance with ease. Among polyols, each of glycerin and ethylene glycol reacts with the above functional groups well. Moreover, each of glycerin and ethylene glycol itself has high biodegradability, and applies a light load to an environment.

In the cross-linked site in which plural carbon nanotubes mutually cross-link, the functional group is —COOR (where R represents a substituted or unsubstituted hydrocarbon group). The cross-linked site is —COO($CH_2$)$_2$OCO— in the case where ethylene glycol is used as the cross-linking agent. In the case where glycerin is used as the cross-linking agent, the cross-linked site is —COOCH$_2$CHOHCH$_2$OCO— or —COOCH$_2$CH(OCO—)CH$_2$OH— if two OH groups contribute to the cross-linking, and the cross-linked site is —COOCH$_2$CH(OCO—)CH$_2$OCO— if three OH groups contribute to the cross-linking. The chemical structure of the cross-linked site may be a chemical structure selected from the group consisting of the above four structures.

A second structure preferable as the structure of the cross-linked site in the first and/or second carbon nanotube structures is a structure formed by chemical bonding of plural functional groups. More preferably, a reaction that causes the chemical bonding is any one of dehydration condensation, a substitution reaction, an addition reaction, and an oxidative reaction.

In the carbon nanotube structure, carbon nanotubes form a cross-linked site by chemically bonding together functional groups bonded to the carbon nanotubes, to thereby form a network structure. Therefore, the size of the cross-linked site for bonding the carbon nanotubes becomes constant depending on the functional group to be bonded. Since a carbon nanotube has an extremely stable chemical structure, there is a low possibility that functional groups or the like excluding a functional group to modify the carbon nanotube are bonded to the carbon nanotube. In the case where the functional groups are chemically bonded together, the designed structure of the cross-linked site can be obtained, and the carbon nanotube structure can be homogeneous.

Furthermore, the functional groups are chemically bonded together, so that the length of the cross-linked site between the carbon nanotubes can be shorter than that in the case where the functional groups are cross-linked with a cross-linking agent. Therefore, the carbon nanotube structure is dense, and tends to readily produce an effect peculiar to a carbon nanotube.

In the carbon nanotube composite structure of the present invention, plural carbon nanotubes form a network structure via multiple cross-linked sites. As a result, excellent characteristics of a carbon nanotube can be stably utilized unlike a material such as a mere carbon nanotube dispersion film or a resin dispersion film in which carbon nanotubes accidentally contact each other and are substantially isolated from each other.

The chemical bonding of plural functional groups is preferably one selected from —COOCO—, —O—, —NHCO—, —COO—, and —NCH— in a condensation reaction. The chemical bonding is preferably at least one selected from —NH—, —S—, and —O— in a substitution reaction. The chemical bonding is preferably —NHCOO— in an addition reaction. The chemical bonding is preferably —S—S— in an oxidative reaction.

Examples of the functional group to be bonded to a carbon nanotube prior to the reaction include —OH—, —COOH, —COOR (where R represents a substituted or unsubstituted hydrocarbon group), —X, —COX (where X represents a halogen atom), —SH, —CHO, —OSO$_2$CH$_3$, —OSO$_2$(C$_2$H$_5$)CH$_2$—NH$_2$, and —NCO. It is preferable to select at least one functional group from the group consisting of the above functional groups.

Particularly preferable examples of the functional group include —COOH. A carboxyl group can be relatively easily introduced into a carbon nanotube. In addition, the resultant substance (a carbon nanotube carboxylic acid) is highly reactive, easily causes a condensation reaction by using a dehydration condensation agent such as N-ethyl-N'-(3-dimethylaminopropyl)carbodiimide, and is thus suitable for forming a structure.

It should be noted that the structures of the cross-linked sites in the first carbon nanotube structure and the second carbon nanotube structure may be identical to or different from each other. In addition, the number of carbon nanotube structures to be combined is not limited to two, and has only to be two or more.

(Production Method)

Subsequently, a method of manufacturing a carbon nanotube composite structure according to the present invention is characterized by including: a first supplying step of supplying the surface of a substrate with a first solution containing plural carbon nanotubes to which functional groups are bonded; a first cross-linking step of chemically bonding the functional groups to form a first carbon nanotube structure in which the plural carbon nanotubes mutually cross-link to construct a network structure; a second supplying step of supplying the first carbon nanotube structure with a second solution containing plural carbon nanotubes to which functional groups are bonded; and a second cross-linking step of chemically bonding the functional groups in the second solution to form a second carbon nanotube structure in which the plural carbon nanotubes mutually cross-link to construct a network structure, the second carbon nanotube structure being combined with the first carbon nanotube structure.

In the present invention, first, in the step of supplying a substrate with a solution containing plural carbon nanotube having functional groups (hereinafter, referred to as "cross-linking solution" in some cases), the whole surface of the substrate or a part of the surface of the substrate is supplied with the solution. Then, in the subsequent cross-linking step, the solution after the supply is cured to form a carbon nanotube structure in which the plural carbon nanotubes mutually cross-link via chemical bonding of the functional groups to construct a network structure. Passing those two steps can stabilize the structure itself of the carbon nanotube structure on the substrate, thereby resulting in the first carbon nanotube structure. Subsequently, in similar steps, the first carbon nanotube structure is supplied with (immersed in) the second solution for cross-linking, thereby resulting in the second carbon nanotube structure combined with the first carbon nanotube structure.

Compositions of the first solution and the second solution are preferably different from each other. In this case, a second structure different from the first carbon nanotube structure is formed to result in a high-density network structure. The compositions can be changed by changing, for instance, diameters or layer structures of nanotubes to be used, carbon nanotube concentrations in the solutions, an average length of carbon nanotubes, or the types of carbon nanotubes. In addition, the compositions can also be changed by a combination of those changes.

At this time, an average diameter of the carbon nanotubes in the first solution is preferably different from an average diameter of the carbon nanotubes in the second solution. In this case, the degree of combination of the first carbon nanotube structure and the second carbon nanotube structure can be improved to increase the density of the carbon nanotube composite structure. Furthermore, in this case, gaps in the first carbon nanotube structure that has been previously formed and has a rough density can be bridged by thin carbon nanotubes, so that the density of the carbon nanotube composite structure is further increased. In addition, it is preferable that main carbon nanotubes in the first solution be multi-wall carbon nanotubes, and that main carbon nanotubes in the second solution be single-wall carbon nanotubes. In this case, large network structure gaps formed in the first carbon nanotube structure are bridged by the single-wall carbon nanotubes constituting the second carbon nanotube structure. As a result, densities of carbon nanotubes can be increased, and the mechanical strengths and electric conductivities of the carbon nanotubes are expected to increase.

In forming chemical bonding between functional groups bonded to carbon nanotubes in the first solution and/or the second solution, a first method preferable for forming a cross-linked site is a method of cross-linking the functional groups with a cross-linking agent in the solution. More preferably, the cross-linking agent is not self-polymerizable.

In the method of manufacturing a carbon nanotube composite structure of the present invention, examples of the functional group for forming the cross-linked site using the cross-linking agent include —OH, —COOH, —COOR (where R represents a substituted or unsubstituted hydrocarbon group), —COX (where X represents is a halogen atom), —NH$_2$, and —NCO. A selection of at least one functional group from the group consisting of the above functional groups is preferable, and in such a case, a cross-linking agent, which may prompt a cross-linking reaction with the selected functional group, is selected as the cross-linking agent.

Further, examples of the preferable cross-linking agent include a polyol, a polyamine, a polycarboxylic acid, a polycarboxylate, a polycarboxylic acid halide, a polycarbodiimide, and a polyisocyanate. A selection of at least one cross-linking agent from the group consisting of the above cross-linking agents is preferable, and in such a case, a functional group, which may prompt a cross-linking reaction with the selected cross-linking agent, is selected as the functional group.

At least one functional group and one cross-linking agent are preferably selected respectively from the group exemplified as the preferable functional group and the group exemplified as the preferable cross-linking agent, so that a combination of the functional group and the cross-linking agent may prompt a cross-linking reaction with each other.

Particularly preferable examples of the functional group include —COOR (where R represents a substituted or unsubstituted hydrocarbon group). A carboxyl group can be relatively easily introduced into a carbon nanotube, and the resultant substance (a carbon nanotube carboxylic acid) is highly reactive. Therefore, after the formation of the substance, it is relatively easy to esterify the substance to convert its functional group into —COOR (where R represents a substituted or unsubstituted hydrocarbon group). The functional group easily causes a cross-linking reaction, and is suitable for the formation of the structure.

In addition, a polyol may be the cross-linking agent corresponding to the functional group. A polyol is cured by a reaction with —COOR (where R represents a substituted or unsubstituted hydrocarbon group), and forms a robust cross-linked substance with ease. Among polyols, each of glycerin and ethylene glycol reacts with the above functional groups well. Moreover, each of glycerin and ethylene glycol itself has high biodegradability, and applies a light load to an environment.

Further, a second preferable method of forming a cross-linked site by using the functional groups bonded to the carbon nanotubes in the first and/or second solutions is a method of chemically bonding plural functional groups together.

From the above, the size of the cross-linked site, which bonds the carbon nanotubes together, becomes constant depending on the functional group to be bonded. A carbon nanotube has an extremely stable chemical structure, so that a possibility of bonding of functional groups or the like excluding the functional groups intended for a modification, is low. When chemically bonding the functional groups together, the designed structure of the cross-linked site can be obtained, providing a homogeneous carbon nanotube structure.

Further, functional groups are chemically bonded together and thus the length of the cross-linked site between the carbon nanotubes can be shortened compared to the case of cross-linking the functional groups together using a cross-linking agent. Therefore, the carbon nanotube structure becomes dense, and effects peculiar to carbon nanotubes are easily obtained.

Examples of a particularly preferable reaction, which chemically bonds the functional groups together, include a condensation reaction, a substitution reaction, an addition reaction, and an oxidative reaction.

In a method of manufacturing a carbon nanotube composite structure of the present invention, the preferable functional group includes: at least one functional group selected from the group consisting of —COOR (where R represents a substituted or unsubstituted hydrocarbon group), —COOH, —COX (where X represents is a halogen atom), —OH, —CHO—, and —NH$_2$ for the condensation reaction; at least one functional group selected from the group consisting of —NH$_2$, —X (where X represents is a halogen atom), —SH, —OH, —OSO$_2$CH$_3$, and —OSO$_2$(C$_6$H$_4$)CH$_3$ for the substitution reaction; at least one functional group selected from the group consisting of —OH and —NCO for the addition reaction; and —SH for the oxidative reaction.

In particular, in the method of manufacturing a carbon nanotube composite structure of the present invention, a molecule containing the functional groups may be bonded to carbon nanotubes to be chemically bonded at the exemplified functional group portion to construct the cross-linked site.

If the reaction is dehydration condensation, a condensation agent is preferably added. Further, the preferable functional group is at least one functional group selected from the group consisting of —COOR (where R represents a substituted or unsubstituted hydrocarbon group), —COOH, —COX (where X represents is a halogen atom), —OH, —CHO, and —NH$_2$.

For example, —COOH is particularly preferably used as the functional group specifically used for the condensation reaction. Introduction of a carboxyl group into carbon nanotubes is relatively easy. Moreover, the resultant substance (a carbon nanotube carboxylic acid) is highly reactive. Therefore, introduction of functional groups for forming a network structure into plural places of one carbon nanotube is easy. In addition, the functional group easily prompts in a condensation reaction, thus being suitable for the formation of the carbon nanotube structure.

The resultant carbon nanotube structure can be combined with another material such as polymer, ceramics, or metal to form a composite.

A formation approach to a cross-linked site in forming a first carbon nanotube may be identical to or different from a formation approach to a cross-linked site in forming a second carbon nanotube. In other words, one approach may involve the use of a cross-linking agent to form a cross-linked site, and the other approach may involve bonding functional groups. Alternatively, both the approaches may involve the use of a cross-linking agent to combine different functional groups with the cross-linking agent. However, in order to increase the density of a carbon nanotube of a carbon nanotube structure in a composite structure, methods of forming a functional group and a cross-linked site are preferably the same. This is because a functional group that has not been cross-linked in forming the first carbon nanotube structure can be cross-linked with a functional group of a carbon nanotube in the second solution during the cross-linking step of the second carbon nanotube structure, with the result that bonding between the first and second carbon nanotube structures proceeds.

The first carbon nanotube structure and/or the second carbon nanotube structure to be used for a carbon nanotube composite structure according to the present invention may be a carbon nanotube structure layer having a laminar structure.

BRIEF DESCRIPTION OF THE DRAWINGS

Preferred embodiment of the present invention will be described in detail based on the following figures, wherein.

DETAILED DESCRIPTION OF THE PREFERRED EMBODIMENT

Hereinafter, each of a carbon nanotube composite structure and a method of manufacturing the carbon nanotube composite structure according to the present invention will be described specifically through the description of the embodiments.

<Carbon Nanotube Composite Structure>

According to one aspect of the present invention, there is provided a carbon nanotube composite structure in which plural carbon nanotube structures to be described in the section of <Carbon Nanotube Structure> are combined to increase densities of carbon nanotubes.

Figure 1:
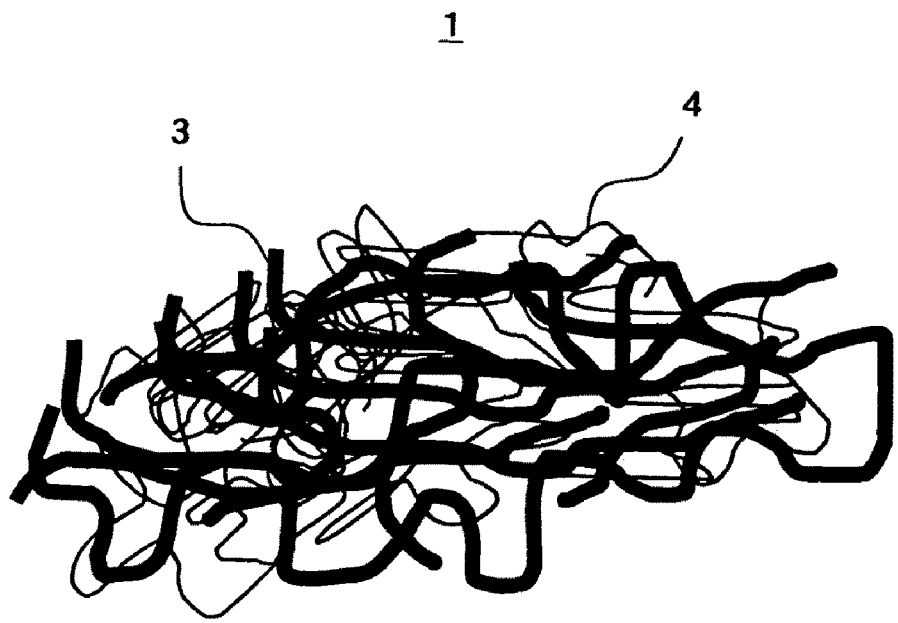
FIG. 1 is a schematic diagram showing a multi-wall nanotube-single-wall nanotube composite according to an embodiment of the present invention.

FIG. 1 is a schematic diagram of a carbon nanotube composite structure 1. The carbon nanotube composite structure 1 is a composite of a first carbon nanotube structure 3 and a second carbon nanotube structure 4. The first carbon nanotube structure 3 is composed of plural multi-wall carbon nanotubes 5. The second carbon nanotube structure 4 is formed into a network in such a manner that gaps in the first carbon nanotube structure are bridged by thinner single-wall nanotubes 6, and the second carbon nanotube structure 4 is also chemically bonded to the multi-wall carbon nanotubes 5 constituting the first carbon nanotube structure.

Figure 2:
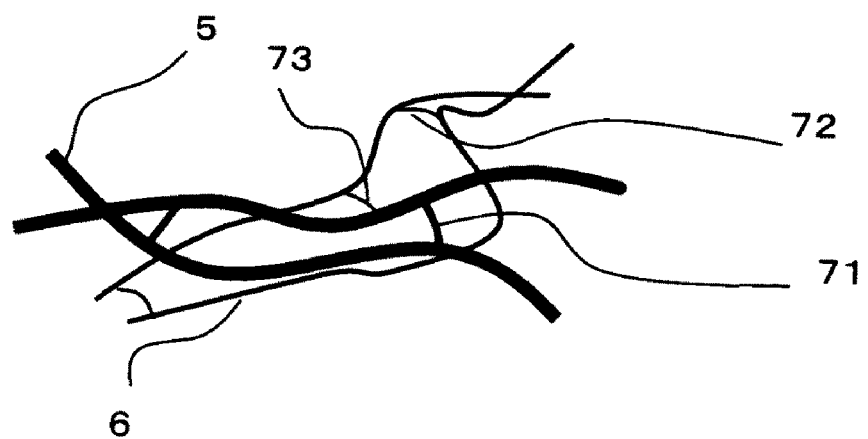
FIG. 2 is an enlarged schematic diagram of a part of the composite shown in FIG. 1.

FIG. 2 is a schematic diagram illustrating details of this structure. The plural multi-wall carbon nanotubes 5 constituting the first carbon nanotube structure 3 are cross-linked by first cross-linked sites 71. The plural single-wall carbon nanotubes 6 constituting the second carbon nanotube structure 4 are cross-linked by second cross-linked sites 72. Furthermore, the multi-wall carbon nanotubes 5 and the single-wall carbon nanotubes 6 are cross-linked by third cross-linked sites 73 for combination. In the figure, cross-linked sites are schematically enlarged. However, the cross-linked sites are actually the bonding between functional groups, and are sufficiently short as compared to the length of a carbon nanotube. Therefore, carbon nanotubes are arranged such that the carbon nanotubes are adjacently joined.

In the above example, multi-wall carbon nanotubes and single-wall carbon nanotubes have been used. However, carbon nanotubes constituting the first carbon nanotube structure may be identical to or different from carbon nanotubes constituting the second carbon nanotube structure. However, constituting one carbon nanotube structure by carbon nanotubes thinner than those constituting the other structure leads to an increase in filling density.

The structures of cross-linked sites may be different from or identical to each other. Here, suppose that —COOH is used as a functional group, that a cross-linked site formation process is a cross-linking reaction using glycerin or another reaction, and that a formation method for the first carbon nanotube structure is identical to a formation method for the second carbon nanotube structure. In such a case, like the first example, —COOH that has not been cross-linked owing to the absence of —COOH as an object to be cross-linked in the vicinity thereof upon formation of the first carbon nanotube structure can be cross-linked with —COOH bonded to a carbon nanotube in the second solution used for forming the second carbon nanotube structure. As a result, the degree of combination of structures can be further improved.

<Carbon Nanotube Structure>

In the present invention, the phrase "carbon nanotube structure" refers to a member in which plural carbon nanotubes mutually cross-link to construct a network structure. Provided that a carbon nanotube structure can be formed in such a manner that carbon nanotubes mutually cross-link to construct a network structure, the carbon nanotube structure may be formed by any method. However, production according to [Method of Manufacturing Carbon Nanotube Composite Structure] to be described later can be readily performed and can provide a high-performance carbon nanotube structure. Moreover, uniformization and control of characteristics can be readily performed.

A basic structure for the first carbon nanotube structure is similar to that for the second carbon nanotube structure. Unless a difference in characteristic induced by the difference in basic structure is utilized, the first and second carbon nanotube structures will be described without distinction.

A first structure for the carbon nanotube structure used as a carbon nanotube structure to be described later is manufactured by curing a solution (cross-linking solution) containing a carbon nanotube having a functional group and a cross-linking agent that causes a cross-linking reaction with the functional group to cause a cross-linking reaction between the functional group of the carbon nanotube and the cross-linking agent to thereby form a cross-linked site. Furthermore, a second structure for the carbon nanotube structure is manufactured by chemically bonding functional groups of carbon nanotubes to form cross-linked sites.

Hereinafter, the carbon nanotube structure layer in the first carbon nanotube structure and/or the second carbon nanotube structure for use in a carbon nanotube composite structure according to the present invention will be described by way of examples of a method of manufacturing a carbon nanotube composite structure according to the present invention. Unless otherwise stated, the structures of cross-linked sites are not considered.

(Carbon Nanotube)

Carbon nanotubes, which are the main component in the present invention, may be single-wall carbon nanotubes or multi-wall carbon nanotubes each having two or more layers. Whether one or both types of carbon nanotubes are used (and, if only one type is to be used, which type is selected) may be decided appropriately taking into consideration the use of the carbon nanotube structure or the cost.

Carbon nanotubes in the present invention include ones that are not exactly shaped like a tube, such as: a carbon nanohorn (a horn-shaped carbon nanotube whose diameter continuously increases from one end toward the other end) which is a variant of a single-wall carbon nanotube; a carbon nanocoil (a coil-shaped carbon nanotube forming a spiral when viewed in entirety); a carbon nanobead (a spherical bead made of amorphous carbon or the like with its center pierced by a tube); a cup-stacked nanotube; and a carbon nanotube with its circumference covered with a carbon nanohorn or amorphous carbon.

Furthermore, carbon nanotubes in the present invention may be ones that contain some substances inside, such as: a metal-containing nanotube which is a carbon nanotube containing metal or the like; and a peapod nanotube which is a carbon nanotube containing a fullerene or a metal-containing fullerene. Also, the carbon nanotubes of either the same type or different types may be used for the first structure and the second structure.

As described above, in the method of manufacturing a carbon nanotube composite structure of the present invention, it is possible to employ carbon nanotubes of any mode, including common carbon nanotubes, variants of common carbon nanotubes, and carbon nanotubes with various modifications, without a problem in terms of reactivity. Therefore, the concept of "carbon nanotube" in the present invention encompasses all of the above.

Those carbon nanotubes are conventionally synthesized by a known method, such as arc discharge, laser ablation, and CVD, and the present invention can employ any of the methods. However, arc discharge in a magnetic field is preferable from the viewpoint of synthesizing a highly pure carbon nanotube.

Carbon nanotubes used in the present invention are preferably equal to and more than 0.3 nm and equal to or less than 100 nm in diameter. If the diameter of the carbon nanotubes exceeds this upper limit, the synthesis becomes difficult and costly. A more desirable upper limit of the diameter of the carbon nanotubes is 30 nm or less.

In general, the lower limit of the carbon nanotube diameter is about 0.3 nm from a structural standpoint. However, too thin a diameter could lower the synthesis yield. It is therefore preferable to set the lower limit of the carbon nanotube diameter to 1 nm or more, more preferably 10 nm or more.

The length of carbon nanotubes used in the present invention is preferably equal to or more than 0.1 μm and equal to or less than 100 μm. If the length of the carbon nanotubes exceeds this upper limit, the synthesis becomes difficult or requires a special method raising cost, which is not preferable. On the other hand, if the length of the carbon nanotubes falls short of this lower limit, the number of cross-link bonding points per carbon nanotube is reduced, which is not preferable. A more preferable upper limit of the carbon nanotube length is 10 μm or less and a more preferable lower limit of the carbon nanotube length is 1 μm or more.

The appropriate carbon nanotube content in the cross-linking solution varies depending on the length and thickness of carbon nanotubes, whether single-wall carbon nanotubes or multi-wall carbon nanotubes are used, the type and amount of functional groups in the carbon nanotubes, the type and amount of cross-linking agents or an additive for bonding functional groups together, the presence or absence of a solvent or other additive used and, if one is used, the type and amount of the solvent or additive, etc. The carbon nanotube content in the solution should be high enough to form an excellent structure after application and curing but not too high to apply the liquid.

Specifically, the ratio of carbon nanotubes to the entire application liquid excluding the mass of the functional groups is 0.01 to 10 g/l, preferably 0.1 to 5 g/l, and more preferably 0.5 to 1.5 g/l, although, as mentioned above, the ranges could be different if the parameters are different.

If the purity of carbon nanotubes to be used is not high enough, it is desirable to raise the purity by refining the carbon nanotubes prior to preparation of the cross-linking solution. In the present invention, the higher the carbon nanotube purity, the better the result can be. Specifically, the purity is preferably 90% or higher, more desirably, 95% or higher. When the purity is low, cross-linking agents are cross-linked to carbon products such as amorphous carbon and tar, which are impurities. This could change the cross-linking distance between carbon nanotubes, leading to a failure in obtaining desired characteristics. No particular limitation is put on how carbon nanotubes are refined, and any known refining method can be employed.

(Functional Group 1)

In the first method in which the cross-linked site is formed using a cross-linking agent, carbon nanotubes can have any functional group to be connected thereto, as long as functional groups selected can be added to the carbon nanotubes chemically and can prompt a cross-linking reaction with any type of cross-linking agent. Specific examples of such functional groups include —COOR, —COX, —MgX, —X (where X represents halogen), —OR, —NR$^1$R$^2$, —NCO, —NCS, —COOH, —OH, —NH$_2$, —SH, —SO$_3$H. —R'CHOH, —CHO, —CN, —COSH, —SR, —SiR'$_3$ (where R, R$^1$, R$^2$, and R' each represent a substituted or unsubstituted hydrocarbon group). Note that employable functional groups are not limited to those examples.

Of those, a selection of at least one functional group from the group consisting of —OH, —COOH, —COOR (where R represents a substituted or unsubstituted hydrocarbon group), —COX (where X represents is a halogen atom), —NH$_2$, and —NCO is preferable. In that case, a cross-linking agent, which can prompt a cross-linking reaction with the selected functional group, is selected as the cross-linking agent.

In particular, —COOR (where R represents a substituted or unsubstituted hydrocarbon group) is particularly preferable.

This is because a carboxyl group can be relatively easily introduced into a carbon nanotube, because the resultant substance (a carbon nanotube carboxylic acid) can be easily introduced as a functional group by esterifying the substance, and because the substance has good reactivity with a cross-linking agent.

R in the functional group —COOR is a substituted or unsubstituted hydrocarbon group, and is not particularly limited. However, R is preferably an alkyl group having 1 to 10 carbon atoms, more preferably an alkyl group having 1 to 5 carbon atoms, and particularly preferably a methyl group or an ethyl group in terms of reactivity, solubility, viscosity, and ease of use as a solvent of a paint.

The appropriate amount of functional groups introduced varies depending on the length and thickness of carbon nanotubes, whether single-wall carbon nanotubes or multi-wall carbon nanotubes are used, the types of functional groups, the use of the carbon nanotube structure, etc. From the viewpoint of the strength of the cross-linked substance obtained, namely, the strength of the structure, a preferable amount of functional groups introduced is large enough to add two or more functional groups to each carbon nanotube. How functional groups are introduced into carbon nanotubes will be explained in the section below titled [Method of Manufacturing a Carbon Nanotube Structure].

Any cross-linking agent, which is an essential ingredient of the cross-linking solution, can be used as long as the cross-linking agent is capable of prompting a cross-linking reaction with the functional groups of the carbon nanotubes. In other words, the types of cross-linking agents that can be selected are limited to a certain degree by the types of the functional groups. Also, the conditions of curing (heating, UV irradiation, irradiation of visible light, natural curing, etc.) as a result of the cross-linking reaction are naturally determined by the combination of those parameters.

Specific examples of the preferable cross-linking agents include a polyol, a polyamine, a polycarboxylic acid, a polycarboxylate, a polycarboxylic acid halide, a polycarbodiimide, and a polyisocyanate. It is desirable to select at least one cross-linking agent from the group consisting of the above. In that case, a functional group which can prompt a reaction with the cross-linking agent is selected as the functional group.

At least one functional group and one cross-linking agent are particularly preferably selected respectively from the group exemplified as the preferable functional group and the group exemplified as the preferable cross-linking agent, so that a combination of the functional group and the cross-linking agent may prompt a cross-linking reaction with each other. The following Table 1 lists the combinations of the functional group of the carbon nanotubes and the corresponding cross-linking agent, which can prompt a cross-linking reaction, along with curing conditions of the combinations.

TABLE 1

| Functional group of carbon nanotube | Cross-linking agent | Curing condition |
| --- | --- | --- |
| —COOR | Polyol | heat curing |
| —COX | Polyol | heat curing |
| —COOH | Polyamine | heat curing |
| —COX | Polyamine | heat curing |
| —OH | Polycarboxylate | heat curing |
| —OH | Polycarboxylic acid halide | heat curing |
| —NH$_2$ | Polycarboxylic acid | heat curing |
| —NH$_2$ | Polycarboxylic acid halide | heat curing |
| —COOH | Polycarbodiimide | heat curing |
| —OH | Polycarbodiimide | heat curing |
| —NH$_2$ | Polycarbodiimide | heat curing |

TABLE 1-continued

| Functional group of carbon nanotube | Cross-linking agent | Curing condition |
| --- | --- | --- |
| —NCO | Polyol | heat curing |
| —OH | Polyisocyanate | heat curing |
| —COOH | Ammonium complex | heat curing |
| —COOH | cis-platin | heat curing |

*where R represents a substituted or unsubstituted hydrocarbon group
*where X represents a halogen Of those combinations, preferable is the combination of —COOR (where R represents a substituted or unsubstituted hydrocarbon group) with good reactivity on a functional group side and a polyol, a polyamine, an ammonium complex, congo red, and cis-platin, which form a robust cross-linked substance with ease. The terms "polyol", "polyamine", and "ammonium complex", in the present invention are genetic names for organic compounds each having two or more OH groups, NH$_2$ groups, and ammonium groups, respectively. Of those, one having 2 to 10 (more preferably 2 to 5) carbon atoms and 2 to 22 (more preferably 2 to 5) OH groups is preferable in terms of cross-linkability, solvent compatibility when an excessive amount thereof is charged, processability of waste liquid after a reaction by virtue of biodegradability (environment aptitude), yield of polyol synthesis, and so on. In particular, the number of carbon atoms is preferably lower within the above range because a gap between carbon nanotubes in the resultant structure can be narrowed to bring the carbon nanotubes into substantial contact with each other (to bring the carbon nanotubes close to each other). Specifically, glycerin and ethylene glycol are particularly preferable, and it is preferable to use one or both of glycerin and ethylene glycol as a cross-linking agent.

From another perspective, the cross-linking agent is preferably a not-self-polymerizable cross-linking agent. In addition to glycerin and ethylene glycol as examples of the polyols, butenediol, hexynediol, hydroquinone, and naphthalenediol are obviously not-self-polymerizable cross-linking agents. More generally, a prerequisite of the not-self-polymerizable cross-linking agent is to be without a pair of functional groups, which can prompt a polymerization reaction with each other, in itself. On the other hand, examples of a self-polymerizable cross-linking agent include one that has a pair of functional groups, which can prompt a polymerization reaction with each other (alkoxide, for example).

(Functional Group 2)

Further, in the second method of obtaining a network structure of mutually cross-linked carbon nanotubes, a cross-linked site of the carbon nanotube structure is formed by chemically bonding plural functional groups, in which at least one end of the cross-linked site is bonded to different carbon nanotubes respectively. In the second method, a functional group to be bonded to the carbon nanotubes is not particularly limited as long as the functional group can be chemically added to the carbon nanotubes and is capable of reacting to each other with any type of additive, and any functional group can be selected. Specific examples of the functional group include —COOR, —COX, —MgX—, —X (where X represents a halogen), —OR, —NR$^1$R$^2$, —NCO, —NCS, —COOH, —OH, —NH$_2$, —SH, —SO$_3$H, —R'CHOH, —CHO, —CN, —COSH, —SR, —SiR'$_3$ (where R, R$^1$, R$^2$, and R$^3$ each represent a substituted or unsubstituted hydrocarbon group), but are not limited to those.

Of those, the preferable functional group includes: at least one functional group selected from the group consisting of —COOR (where R represents a substituted or unsubstituted hydrocarbon group), —COOH, —COX (where X represents a halogen atom), —OH, —CHO—, and —NH$_2$ for the condensation reaction; at least one functional group selected from the group consisting of —NH$_2$, —X (where X represents a halogen atom), —SH, —OH, —OSO$_2$CH$_3$, and —OSO$_2$(C$_6$H$_4$)CH$_3$ for the substitution reaction; at least one functional group selected from the group consisting of —OH and —NCO for the addition reaction; and —SH for the oxidative reaction.

Further, it is also possible to bond a molecule, which partially contains those functional groups, with the carbon nanotubes to be chemically bonded at a preferable functional group portion exemplified above. Even in this case, a functional group with a large molecular weight to be bonded to the carbon nanotubes is bonded as intended, enabling control of a length of the cross-linked site.

(Additive)

Any additive that is capable of making the functional groups of the carbon nanotubes react to each other can be mixed in the cross-linking solution. In other words, the types of additives that can be selected are limited to a certain degree by the types of the functional groups and the reaction type. Also, the condition of curing (heating, UV irradiation, irradiation of visible light, natural curing, etc.) as a result of the reaction is naturally determined by the combination of those parameters.

(Condensation Agent)

To give specific examples of preferable additives, an acid catalyst or a dehydration condensation agent, for example, sulfuric acid, N-ethyl-N'-(3-dimethylaminopropyl)carbodiimide, and dicyclohexyl carbodiimide, is preferred as a condensation agent. Preferably, at least one condensation agent is selected from the group consisting of the above. The functional groups selected have to react to each other with the help of the selected condensation agent.

(Base)

When a substitution reaction is to be utilized, a base is an essential ingredient of the cross-linking solution. An arbitrary base is selected in accordance with the degree of acidity of hydroxyl groups.

Preferably, the base is at least one selected from the group consisting of sodium hydroxide, potassium hydroxide, pyridine, and sodium ethoxide. In that case, a substitution reaction is to take place among the functional groups with the help of the selected base.

It is particularly preferable to select a combination of functional groups such that at least two functional groups from each of the example groups that are given above as examples of preferable functional groups react to each other. Table 2 below lists functional groups of carbon nanotubes and names of the corresponding reactions. An addition reaction does not necessarily need an additive. In an oxidative reaction, an additive is not necessarily needed but adding an oxidative reaction accelerator is preferable. A specific example of the accelerator is iodine.

TABLE 2

| Bonding site | Functional group of carbon nanotube(A) | Functional group of carbon nanotube (B) | Reaction |
| --- | --- | --- | --- |
| —COOCO— | —COOH | — | Dehydration condensation |
| —S—S— | —SH | — | Oxidative reaction |
| —O— | —OH | — | Dehydration condensation |
| —NH—CO— | —COOH | —NH$_2$ | Dehydration condensation |
| —COO— | —COOH | —OH | Dehydration condensation |
| —COO— | —COOR | —OH | Dehydration condensation |
| —COO— | —COX | —OH | Dehydration condensation |
| —CH=N— | —CHO | —NH$_2$ | Dehydration condensation |
| —NH— | —NH$_2$ | —X | Substitution reaction |
| —S— | —SH | —X | Substitution reaction |
| —O— | —OH | —X | Substitution reaction |
| —O— | —OH | —OSO$_2$CH$_3$ | Substitution reaction |
| —O— | —OH | —OSO$_2$(C$_6$H$_4$)CH$_3$ | Substitution reaction |
| —NH—COO— | —OH | —N=C=O | Addition reaction |

*where R represents a substituted or unsubstituted hydrocarbon group
*where X represents a halogen Next, the content of a cross-linking agent or of an additive for bonding a functional group in the cross-linking solution varies depending on the type of the cross-linking agent (including whether the cross-linking agent is self-polymerizable or not self-polymerizable) and the type of the additive for bonding a functional group. The content also varies depending on the length and thickness of a carbon nanotube, whether the carbon nanotube is of a single-wall type or a multi-wall type, the type and amount of a functional group of the carbon nanotube, the presence or absence, types, and amounts of a solvent and other additives, and the like. Therefore, the content can not be determined uniquely. In particular, for example, glycerin or ethylene glycol can also provide characteristics of a solvent because a viscosity of glycerin or ethylene glycol is not so high, and thus an excessive amount of glycerin or ethylene glycol can be added.

(Other Additive)

The cross-linking solution may contain various additives including a solvent, a viscosity modifier, a dispersant, and a cross-linking accelerator. A solvent is added when satisfactory application of the cross-linking solution is not achieved with solely the cross-linking agents or the additive for bonding the functional groups. A solvent that can be employed is not particularly limited, and may be appropriately selected according to the types of the cross-linking agents. Specific examples of employable solvents include: organic solvents such as methanol, ethanol, isopropanol, n-propanol, butanol, methyl ethyl ketone, toluene, benzene, acetone, chloroform, methylene chloride, acetonitrile, diethyl ether, and tetrahydrofuran (THF); water; aqueous solutions of acids; and alkaline aqueous solutions. A solvent as such is added in an amount that is not particularly limited but determined appropriately by taking into consideration the ease of applying the cross-linking solution.

A viscosity modifier is added when satisfactory application of the cross-linking solution is not achieved with solely the cross-linking agents and the additive for bonding the functional groups. A viscosity modifier that can be employed is not particularly limited, and may be appropriately selected according to the cross-linking agents used. Specific examples of employable viscosity modifiers include methanol, ethanol, isopropanol, n-propanol, butanol, methyl ethyl ketone, toluene, benzene, acetone, chloroform, methylene chloride, acetonitrile, diethyl ether, and THF.

Some of those viscosity modifiers have the function of a solvent when added in a certain amount, and it is meaningless to apparently discriminate viscosity modifiers from solvents. A viscosity modifier as such is added in an amount that is not particularly limited but determined by taking into consideration the ease of applying the cross-linking solution.

A dispersant is added to the cross-linking solution in order to maintain the dispersion stability of the carbon nanotubes, the cross-linking agents, or the additive for bonding the functional groups in the application liquid. Various known surface-active agents, water-soluble organic solvents, water, aqueous solutions of acids, alkaline aqueous solutions, etc. can be employed as a dispersant. However, a dispersant is not always necessary since components of the coating material of the present invention have high dispersion stability by themselves. In addition, depending on the use of the structure after the formation, the presence of a dispersant and like other impurities in the structure may not be desirable. In such case, a dispersant is not added at all, or is added in a very small amount.

(Method of Preparing the Cross-Linking Solution)

A method of preparing a cross-linking solution is described next. The cross-linking solution is prepared by mixing, as needed, carbon nanotubes that have functional groups with a cross-linking agent that prompts a cross-linking reaction with the functional groups or an additive that causes the functional groups to form chemical bonding among themselves (mixing step). The mixing step may be preceded by an addition step in which the functional groups are introduced into the carbon nanotubes.

If carbon nanotubes having functional groups are starting materials, the preparation starts with the mixing step. If normal carbon nanotubes themselves are starting materials, the preparation starts with the addition step. The addition step is a step of introducing desired functional groups into carbon nanotubes. How functional groups are introduced varies depending on the type of functional group. One method is to add a desired functional group directly, and another method is to introduce a functional group that is easy to attach and then substitute the whole functional group or a part thereof or attach a different functional group to the former functional group in order to obtain the objective functional group. Still another method is to apply a mechanochemical force to a carbon nanotube to break or modify only a small portion of a graphene sheet on the surface of the carbon nanotube and introduce various functional groups from the broken or modified portion.

Cup-stacked carbon nanotubes, which have many defects on the surface upon manufacture, and carbon nanotubes that are formed by vapor phase growth are relatively easy to introduce functional groups. On the other hand, carbon nanotubes each having a perfect graphene sheet structure exert the carbon nanotube characteristics more effectively and are easier to control the characteristics. Consequently, it is particularly preferable to use a multi-wall carbon nanotube so that defects are formed as many as appropriate as a carbon nanotube structure on its outermost layer to bond functional groups for cross-linking while the inner layers having less structural defects exert the carbon nanotube characteristics.

There is no particular limitation put on the addition step and any known method can be employed. Various addition methods disclosed in JP 2002-503204 A may be employed in the present invention depending on the purpose. A description is given on a method of introducing —COOR (where R represents a substituted or unsubstituted hydrocarbon group), a particularly desirable functional group among the functional groups listed in the above. To introduce —COOR (where R represents a substituted or unsubstituted hydrocarbon group) into carbon nanotubes, carboxyl groups may be (a) added to the carbon nanotubes once, and then (b) esterified.

(a) Addition of Carboxyl Group

To introduce carboxyl groups into carbon nanotubes, carboxyl groups are refluxed together with an acid having an oxidizing effect. This operation is relatively easy and is preferable since carboxyl groups with high reactivity are attached to carbon nanotubes. A brief description of the operation is given below.

An acid having an oxidizing effect is, for example, concentrated nitric acid, hydrogen peroxide water, a mixture of sulfuric acid and nitric acid, or aqua regia. When concentrated nitric acid is used, in particular, the concentration is preferably 5 mass % or higher, more preferably, 60 mass % or higher.

A normal reflux method can be employed. The temperature at which reflux is performed is preferably set to a level near the boiling point of the acid used. When concentrated nitric acid is used, for instance, the temperature is preferably set to 120 to 130° C. The reflux preferably lasts 30 minutes to 20 hours, more preferably, 1 hour to 8 hours.

Carbon nanotubes to which carboxyl groups are attached (a carbon nanotube carboxylic acid) are generated in the reaction liquid after the reflux. The reaction liquid is cooled down to room temperature and then receives a separation operation or washing as necessary, thereby obtaining the objective carbon nanotube carboxylic acid.

(b) Esterification

The target functional group —COOR (where R represents a substituted or unsubstituted hydrocarbon group) can be introduced by adding an alcohol to the obtained carbon nanotube carboxylic acid and dehydrating the mixture for esterification.

The alcohol used for the esterification is determined according to R in the formula of the functional group. That is, if R is $CH_3$, the alcohol is methanol, and if R is $C_2H_5$, the alcohol is ethanol. A catalyst is generally used in the esterification, and a conventionally known catalyst such as sulfuric acid, hydrochloric acid, or toluenesulfonic acid can also be used in the present invention. The use of sulfuric acid as a catalyst is preferable from a view of not prompting a side reaction in the present invention.

The esterification may be conducted by adding an alcohol and a catalyst to a carbon nanotube carboxylic acid and refluxing the mixture at an appropriate temperature for an appropriate time period. A temperature condition and a time period condition in this case depend on type of a catalyst, type of alcohol, or the like and cannot be simply determined, but a reflux temperature close to the boiling point of the alcohol used is preferable. The reflux temperature is preferably in the range of 60 to 70° C. for methanol, for example. Further, a reflux time period is preferably in the range of 1 to 20 hours, more preferably in the range of 4 to 6 hours.

A carbon nanotube with the functional group —COOR (where R represents a substituted or unsubstituted hydrocarbon group) added can be obtained by separating a reaction product from a reaction solution after esterification and washing the reaction product as required.

The mixing step is a step of mixing, as required, carbon nanotubes which contain functional groups with a cross-linking agent prompting a cross-linking reaction with the functional groups or an additive for bonding the functional groups to prepare the cross-linking solution. In the mixing step, other components described in the aforementioned section titled [Carbon Nanotube Structure] are mixed, in addition to the carbon nanotubes containing functional groups and the cross-linking agents. Then, preferably, an amount of a solvent or a viscosity modifier is adjusted considering ease of applying to prepare the cross-linking solution just before supply to the substrate.

Simple stirring with a spatula and stirring with a stirrer of a stirring blade type, a magnetic stirrer, and a stirring pump may be used. However, to achieve higher degree of uniformity in dispersion of the carbon nanotubes to enhance storage stability while fully extending a network structure by cross-linking of the carbon nanotubes, an ultrasonic disperser or a homogenizer may be used for powerful dispersion. However, when using a stirring device with a strong shear force of stirring such as a homogenizer, there arises a risk of cutting and damaging the carbon nanotubes in the solution, thus the device may be used for a very short time period.

A carbon nanotube composite structure is formed by supplying a substrate surface with the cross-linking solution described above and curing the substrate. A supplying method and a curing method are described in detail in the section below titled [Method of Manufacturing a Carbon Nanotube Composite Structure].

The carbon nanotube structure in the present invention is in a state where carbon nanotubes are networked. In detail, the carbon nanotube structure is cured into a matrix shape, carbon nanotubes are connected to each other via cross-linked sites, and characteristics of a carbon nanotube itself such as high electron- and hole-transmission characteristics can be exerted sufficiently. In other words, the carbon nanotube structure has carbon nanotubes that are tightly connected to each other, contains no other binders and the like, and is thus composed substantially only of carbon nanotubes, so that characteristics peculiar to a carbon nanotube are fully utilized. The plural carbon nanotube structures compose the carbon nanotube composite structure of the present invention. Thus, by increasing the density of the carbon nanotubes, the carbon nanotube composite structure can be utilized in a wider range.

A thickness of the carbon nanotube structure of the present invention can be widely selected from being very thin to being thick according to an application. Lowering a content of the carbon nanotubes in the cross-linking solution used (simply, lowering the viscosity by diluting) and applying the cross-linking solution in a thin coat form allows a very thin coat to be obtained. Similarly, raising a content of the carbon nanotubes allows a thick structure to be obtained. Further, repeating the application allows an even thicker structure to be obtained. Formation of a very thin structure from a thickness of about 10 nm is possible, and formation of a thick structure without an upper limit is possible through recoating. A possible coat thickness with one coating is about 5 μm. Further, a desired shape of the structure can be obtained by injecting the cross-linking solution, in which a content or the like is adjusted, to a mold and bonding.

In the first and/or second carbon nanotube structures, when using the cross-linking agent of the first method, a site where the carbon nanotubes cross-link together, that is, the cross-linked site formed by a cross-linking reaction between the functional groups of the carbon nanotubes and the cross-linking agents has a cross-linking structure. In the cross-linking structure, residues of the functional group remaining after a cross-linking reaction are connected together with a connecting group, which is a residue of the cross-linking agent remaining after a cross-linking reaction.

As described, the cross-linking agent, which is a component of the cross-linking solution, is preferably not self-polymerizable. If the cross-linking agent is not self-polymerizable, the carbon nanotube structure layer finally manufactured would be constructed from a residue of only one cross-linking agent. The gap between the carbon nanotubes to be cross-linked can be controlled to a size of a residue of the cross-linking agent used, thereby providing a desired network structure of the carbon nanotubes with high duplicability. Further, plural cross-linking agents are not present between the carbon nanotubes, thus enabling an enhancement of a substantial density of the carbon nanotubes in the carbon nanotube structure. Further, reducing a size of a residue of the cross-linking agent can extremely narrow a gap between each of the carbon nanotubes both electrically and physically (carbon nanotubes are substantially in direct contact with each other).

When forming the carbon nanotube structure with a cross-linking solution prepared by selecting a single functional group of the carbon nanotubes and a single not-self-polymerizable cross-linking agent, the cross-linked site of the layer will have the same cross-linking structure (Example 1). Further, even when forming the carbon nanotube structure layer with a cross-linking solution prepared by selecting plural types of functional groups of the carbon nanotubes and/or plural types of not-self-polymerizable cross-linking agents, the cross-linked site of the layer will mainly have a cross-linking structure based on a combination of the functional group and the not-self-polymerizable cross-linking agent mainly used (Example 2).

On the contrary, when forming the carbon nanotube structure layer with a cross-linking solution prepared by selecting self-polymerizable cross-linking agents, without regard to whether the functional groups and the cross-linking agents are of single or plural types, the cross-linked site of the layer where carbon nanotubes cross-link together will not mainly have a specific cross-linking structure. This is because the cross-linked site will be in a state where numerous connecting groups with different connecting (polymerization) numbers of the cross-linking agents coexist.

In other words, by selecting not-self-polymerizable cross-linking agents, the cross-linked sites, where the carbon nanotubes of the carbon nanotube structure layer cross-link together, bond with the functional group through a residue of only one cross-linking agent, thus forming a mainly identical cross-linking structure. "Mainly identical" here is a concept including a case with all of the cross-linked sites having an identical cross-linking structure as described above (Example 1), as well as a case with the cross-linking structure based on a combination of the functional group and the not-self-polymerizable cross-linking agent mainly used becomes a main structure with respect to the whole cross-linked site as described above (Example 2).

When referring as "mainly identical", a "ratio of identical cross-linked sites" with respect to the whole cross-linked sites will not have a uniform lower limit defined. The reason is that a case of imparting a functional group or a cross-linking structure with an aim different from formation of a carbon nanotube network may be assumed for example. However, in order to actualize high electrical or physical characteristics peculiar to carbon nanotubes with a strong network, a "ratio of identical cross-linked sites" with respect to the total cross-linked sites is preferably 50% or more, more preferably 70% or more, further more preferably 90% or more, and most preferably 100%, based on numbers. Those number ratios can be determined through, for example, a method of measuring an intensity ratio of an absorption spectrum corresponding to the cross-linking structure with an infrared spectrum.

As described, if a carbon nanotube structure layer has the cross-linked site with a mainly identical cross-linking structure where carbon nanotubes cross-link, a uniform network of the carbon nanotubes can be formed in a desired state. In addition, the carbon nanotube network can be constructed with homogeneous, satisfactory, and expected electrical or physical characteristics and high duplicability.

Further, the connecting group preferably contains hydrocarbon for a skeleton thereof. "Hydrocarbon for a skeleton" here refers to a main chain portion of the connecting group consisting of hydrocarbon, the main portion of the connecting group contributing to connecting residues together of the functional groups of carbon nanotubes to be cross-linked remaining after a cross-linking reaction. A side chain portion, where hydrogen of the main chain portion is substituted by another substituent, is not considered. Obviously, it is more preferable that the whole connecting group consists of hydrocarbon.

The number of carbon atoms in the hydrocarbon is preferably 2 to 10, more preferably 2 to 5, and further more preferably 2 to 3. The connecting group is not particularly limited as long as the connecting group is divalent or more.

In the cross-linking reaction of the functional group —COOR (where R represents a substituted or unsubstituted hydrocarbon) and ethylene glycol, exemplified as a preferable combination of the functional group of carbon nanotubes and the cross-linking agent, the cross-linked site, where plural carbon nanotubes cross-link to each other, becomes —COO(CH$_2$)$_2$OCO—.

Further, in the cross-linking reaction of the functional group —COOR (where R represents a substituted or unsubstituted hydrocarbon) and glycerin, the cross-linked site, where plural carbon nanotubes cross-link to each other, becomes —COOCH$_2$CHOHCH$_2$OCO— and/or —COOCH$_2$CH(OCO—)CH$_2$OH if two OH groups contribute in the cross-link, and the cross-linked site becomes —COOCH$_2$CH(OCO—)CH$_2$OCO— if three OH groups contribute in the cross-link.

As has been described, the carbon nanotube structure has a network structure that is composed of plural carbon nanotubes connected to each other through plural cross-linked sites. Thus, contact or arrangement of carbon nanotubes is not disturbed, unlike a mere carbon nanotube dispersion film. Therefore, there are stably obtained characteristics that are unique of carbon nanotubes, including: electrical characteristics such as high electron- and hole-transmission characteristics; physical characteristics such as thermal conductivity and toughness; and light absorption characteristics.

Further, in the second method of forming the cross-linked site through chemically bonding plural functional groups, in which at least one end of the cross-linked site of the first and/or second carbon nanotube structures is bonded to different carbon nanotubes respectively, the carbon nanotube structure has carbon nanotubes connected in a matrix form through a cross-linked portion. Therefore, characteristics of carbon nanotubes, such as high electron- and hole-transmission characteristics, are easily obtained. That is, the carbon nanotube structure has carbon nanotubes that are tightly connected together, and contains no other binders. Therefore, the carbon nanotube structure can be composed substantially only of carbon nanotubes.

Further, the cross-linked sites are formed by a reaction among the functional groups, thus enabling an enhancement of the actual carbon nanotube density of the carbon nanotube structure. If the functional groups are reduced in size, the carbon nanotubes can be brought very close to each other both electrically and physically, and characteristics of a carbon nanotube itself can be more easily obtained.

Further, cross-linked sites are chemical bonding of the functional groups, thus the carbon nanotube structures mainly have the same cross-linking structure. Therefore, a uniform network of carbon nanotubes can be formed into a desired state. Therefore, electrical and physical carbon nanotube characteristics that are homogeneous and excellent can be obtained. Furthermore, electrical or physical characteristics expected from carbon nanotubes, or close to the expected level or with high duplicability, can be obtained.

A layer except the carbon nanotube structure layer may be formed in the carbon nanotube composite structure of the present invention. For example, placing an adhesive layer between the surface of the substrate and the carbon nanotube structure layer for enhancing adhesiveness therebetween can improve the adhesive strength of a patterned carbon nanotube structure layer, and is thus preferable. In addition, the periphery of the carbon nanotube structure can be coated with an insulator, an electric conductor, or the like according to wire applications.

Specifics of the above-described carbon nanotube composite structure of the present invention including its shape will be made clear in the following section of [Method of Manufacturing a Carbon Nanotube Composite Structure] and Example. Note that the descriptions below show merely examples and are not to limit specific modes of the carbon nanotube composite structure of the present invention.

[Method of Manufacturing a Carbon Nanotube Composite Structure]

A method of manufacturing a carbon nanotube composite structure of the present invention is a method suitable for manufacture of the above-described carbon nanotube composite structure of the present invention. Specifically, the method of manufacturing a carbon nanotube composite structure of the present invention includes: (A-1) a first supplying step of supplying a surface of a substrate with a first solution that contains plural carbon nanotubes having functional groups connected thereto; (B-1) a first cross-linking step for forming a first carbon nanotube structure that has a network structure composed of the plural carbon nanotubes that are cross-linked to each other by chemical bonding formed among the functional groups; (A-2) a second supplying step of supplying the first carbon nanotube structure with a second solution that contains plural carbon nanotubes having functional groups connected thereto; and (B-2) a second cross-linking step for forming a second carbon nanotube structure that has a network structure composed of the plural carbon nanotubes that are cross-linked to each other by chemical bonding formed among the functional groups of the second solution, the second carbon nanotube structure being combined with the first carbon nanotube structure.

Hereinafter, an example of a method of manufacturing a carbon nanotube composite structure according to the present invention will be described for each step.

(A-1) First Supplying Step

In the present invention, the "supplying step" is a step of supplying the surface of a substrate such as a slide glass with a solution containing a carbon nanotube having a functional group.

The supplying method is not particularly limited, and any method can be adopted from a wide range to supply the cross-linking application liquid. For example the liquid may be simply dropped or spread with a squeegee or may be applied by a common application method. Examples of common application methods include spin coating, wire bar coating, cast coating, roll coating, brush coating, dip coating, spray coating, and curtain coating. Further, the cross-linking solution can be also supplied by injecting into a mold or the like with a prescribed shape.

(B-1) First Cross-Linking Step

In the present invention, a cross-linking step is a step of forming a first carbon nanotube structure that has a network structure composed of the plural carbon nanotubes cross-linked with each other through curing of the cross-linking solution after supply.

(A-2) Second Supplying Step

This step is similar to the step A-1, but is different from the step A-1 in that the first carbon nanotube structure is supplied with the second solution.

(B-2) Second Cross-Linking Step

This step is similar to the step B-1. However, the second carbon nanotube structure formed as the result of the second cross-linking step is combined with the first carbon nanotube structure.

An operation carried out in the cross-linking step is naturally determined according to the combination of the functional groups with the cross-linking agent or the additives for chemically bonding the functional groups together. If a combination of thermally curable functional groups is employed, the applied solution is heated by various heaters or the like. If a combination of functional groups that are cured by ultraviolet rays is employed, the applied solution is irradiated with a UV lamp or left under the sun. If a combination of self-curable functional groups is employed, it is sufficient to let the applied solution stand still. Leaving the applied solution to stand still is deemed as one of the operations that may be carried out in the cross-linking step of the present invention.

Heat curing (polyesterification through an ester exchange reaction) is conducted for the case of a combination of a carbon nanotube, to which the functional group —COOR (where R represents a substituted or unsubstituted hydrocarbon group) is added, and a polyol (among them, glycerin and/or ethylene glycol). Heating causes an ester exchange reaction between —COOR of the esterified carbon nanotube carboxylic acid and R'—OH (where R' represents a substituted or unsubstituted hydrocarbon group) of a polyol. As the reaction progresses multilaterally, the carbon nanotubes are cross-linked until a network of carbon nanotubes connected to each other constructs a carbon nanotube structure layer.

To give an example of conditions preferable for the above combination, the heating temperature is specifically set to preferably 50 to 500° C., more preferably 150 to 200° C., and the heating period is specifically set to preferably 1 minute to 10 hours, more preferably 1 hour to 2 hours.

In addition, the number of times of combination to be performed is not limited to two, and may be two or more. Repeated combination enables a carbon nanotube to be structured at a higher density.

The resultant carbon nanotube composite may be utilized as it is. Alternatively, the resultant carbon nanotube composite may be subjected to patterning through ashing or the like to be used for an electronic device. Specifically, the first and second carbon nanotube structures may be formed by mainly using single-wall carbon nanotubes exhibiting semiconductor characteristics. Alternatively, a high-density carbon nanotube structure may be formed by doping impurities, introducing defects into carbon nanotubes, or the like, which is used as a semiconductor material for a silicon wafer.

Hereinafter, a more specific description of the present invention is given by way of an example. However, the present invention is not limited to the following example.

Example

Carbon Nanotube Composite Structure Using Glycerin-Cross-Linked Multi-Wall Carbon Nanotube Structure and Single-Wall Carbon Nanotube Structure (First Addition Step)

Figure 3:
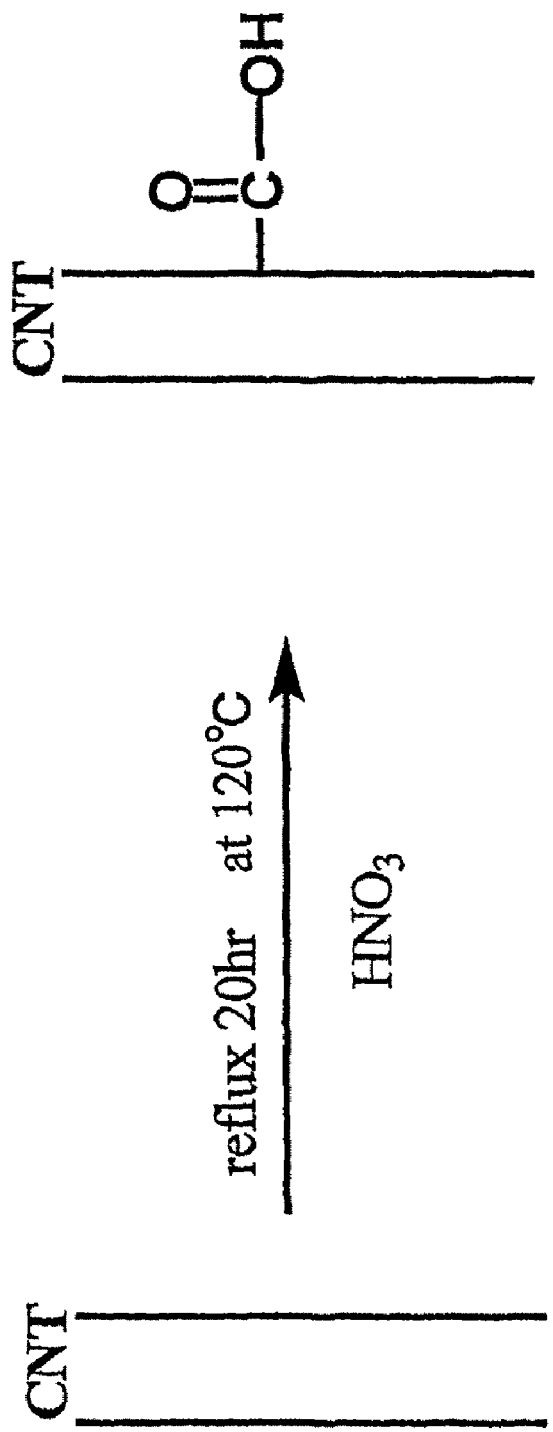
FIG. 3 is a reaction scheme for the synthesis of a carbon nanotube carboxylic acid in (Addition Step) of an example of the present invention.

30 mg of multi-layer carbon nanotube powder (purity: 90%, average diameter: 30 nm, average length: 3 μm, available from Science Laboratory Inc.) was added to 20 ml of concentrated nitric acid (a 60 mass % aqueous solution, available from KANTO KAGAKU) for reflux at 120° C. for 20 hours to synthesize a carbon nanotube carboxylic acid. A reaction scheme of the above is shown in FIG. 3. In FIG. 3, a carbon nanotube (CNT) portion is represented by two parallel lines (same applies for other figures relating to reaction schemes).

The temperature of the solution was returned to room temperature, and the solution was centrifuged at 5,000 rpm for 15 minutes to separate a supernatant liquid from a precipitate. The recovered precipitate was dispersed in 10 ml of pure water, and the dispersion liquid was subjected to centrifugal separation again at 5,000 rpm for 15 minutes to separate a supernatant liquid from a precipitate (The above process constitutes one washing operation). This washing operation was repeated five more times and lastly a precipitate was recovered.

(Esterification)

Figure 4:
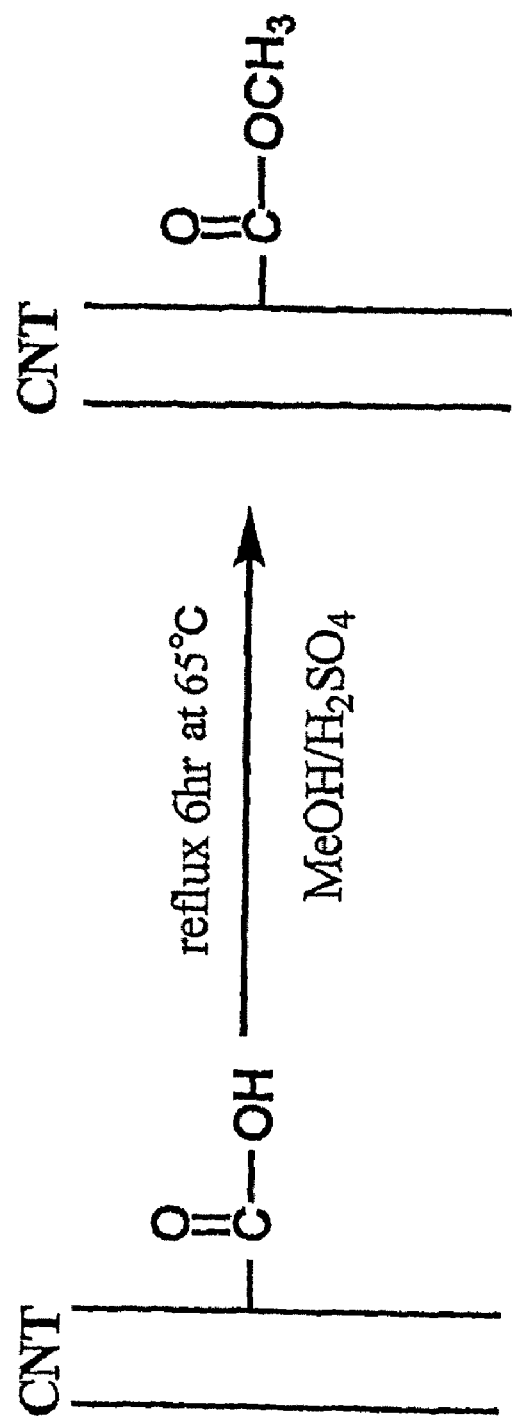
FIG. 4 is a reaction scheme for esterification in (Addition Step) of the example.

30 mg of the carbon nanotube carboxylic acid prepared in the above step was added to 25 ml of methanol (available from Wako Pure Chemical Industries, Ltd.). Then, 5 ml of concentrated sulfuric acid (98 mass %, available from Wako Pure Chemical Industries, Ltd.) was added to the mixture, and the whole was refluxed at 65° C. for 4 hours for methyl esterification. The above reaction scheme is shown in FIG. 4.

After the temperature of a solution had been returned to room temperature, a precipitate was separated through filtration. The precipitate was washed with water and then recovered.

(First Mixing Step)

10 mg of the carbon nanotube carboxylic acid methyl esterified in the above step was added to 5 ml of glycerin (available from KANTO KAGAKU), and the whole was mixed using an ultrasonic dispersing machine. Further, the mixture was added to 10 ml of methanol, a viscosity modifier.
(First Supplying Step)

About 0.1 ml of the thus obtained coating material was dropped and supplied onto an SiO$_2$/Si substrate using a Pasteur pipette.
(First Curing Step)

Figure 5:
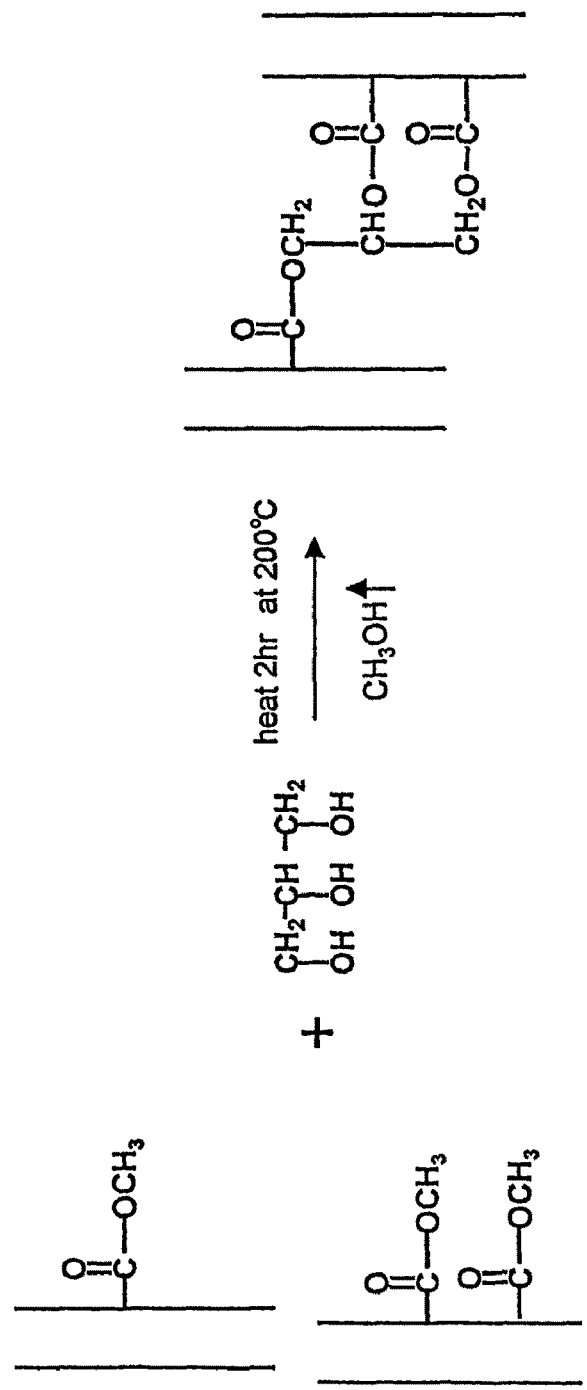
FIG. 5 is a reaction scheme for cross-linking by an ester exchange reaction in (Cross-linking Step) of the example.

The substrate to which the coating material of this example had been supplied as above was heated at 200° C. for 2 hours to start polymerization by an ester exchange reaction, thereby obtaining a glycerin-cross-linked multi-wall carbon nanotube structure having a network structure. A reaction scheme of this is shown in FIG. 5.
(Second Addition Step)

30 mg of single-wall carbon nanotube powder (purity: 90%, average diameter: 1.2 nm, average length: 1.5 μm, available from Science Laboratory Inc.) was added to 20 ml of concentrated nitric acid (a 60 mass % aqueous solution, available from KANTO KAGAKU) for reflux at 120° C. for 1.5 hours to synthesize a carbon nanotube carboxylic acid (FIG. 3).

The temperature of the solution was returned to room temperature, and the solution was centrifuged at 5,000 rpm for 15 minutes to separate a supernatant liquid from a precipitate. The recovered precipitate was dispersed in 10 ml of pure water, and the dispersion liquid was subjected to centrifugal separation again at 5,000 rpm for 15 minutes to separate a supernatant liquid from a precipitate. (The above process constitutes one washing operation.) This washing operation was repeated five more times and lastly a precipitate was recovered.
(Esterification)

30 mg of the carbon nanotube carboxylic acid prepared in the above step was added to 25 ml of methanol (available from Wako Pure Chemical Industries, Ltd.). Then, 5 ml of concentrated sulfuric acid (98 mass %, available from Wako Pure Chemical Industries, Ltd.) was added to the mixture, and the whole was refluxed at 65° C. for 4 hours for methyl esterification (FIG. 4).

After the temperature of a solution had been returned to room temperature, a precipitate was separated through filtration. The precipitate was washed with water and then recovered.
(Second Mixing Step)

10 mg of the single-wall carbon nanotube carboxylic acid methyl esterified in the above step was added to 5 ml of glycerin (available from KANTO KAGAKU) and the whole was mixed using an ultrasonic dispersing machine. Further, the mixture was added to 10 ml of methanol, a viscosity modifier.
(Second Supplying Step)

About 0.1 mL of a cross-linking solution composed of the single-wall carbon nanotube carboxylic acid prepared in the above second mixing step was dropped onto the glycerin-cross-linked multi-wall carbon nanotube structure formed in the above first curing step so that the glycerin-cross-linked multi-wall carbon nanotube structure was supplied with (immersed in) the cross-linking solution.
(Second Curing Step)

Figure 6:
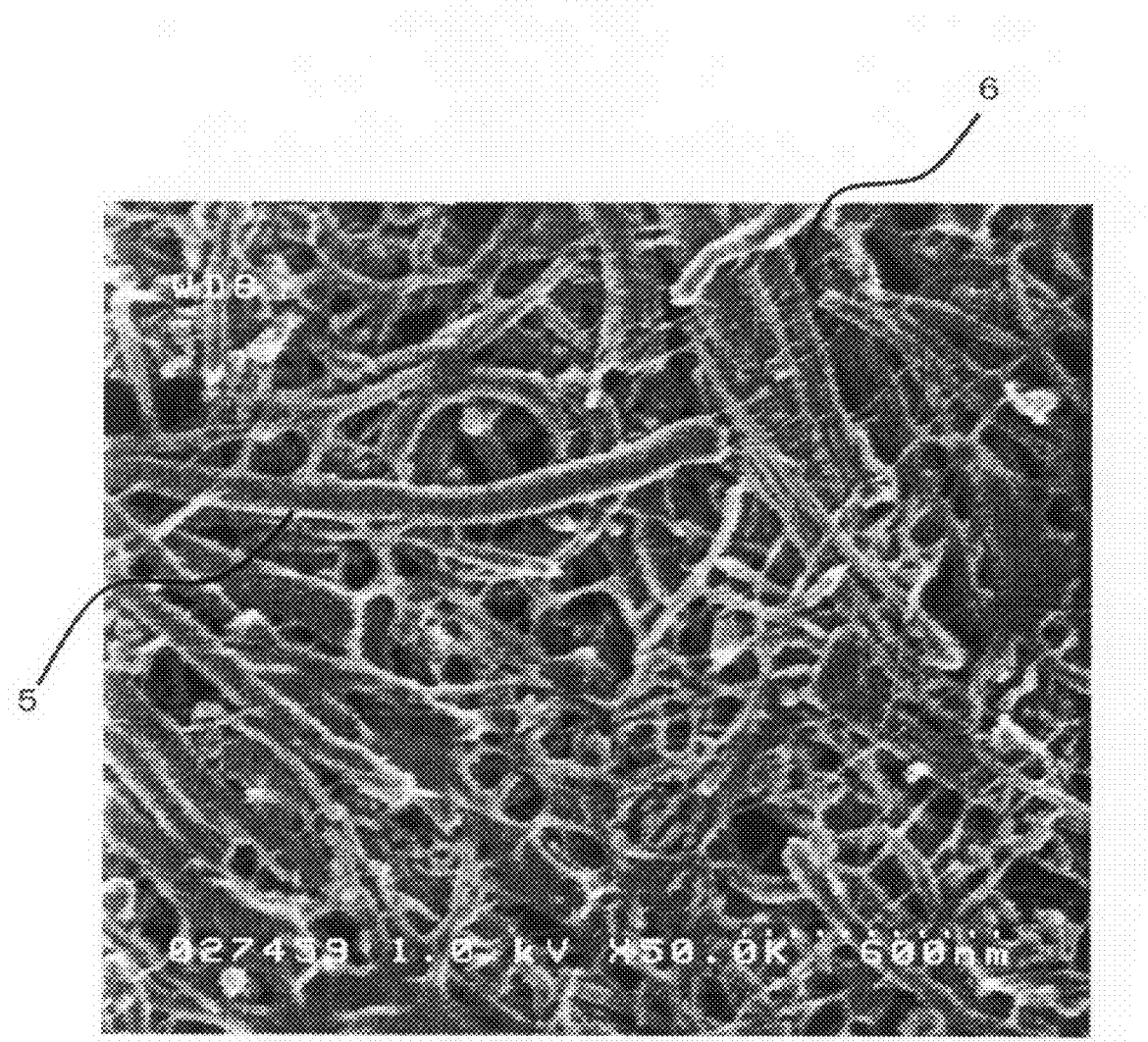
FIG. 6 is an electron micrograph of a multi-wall nanotube-single-wall nanotube composite formed in the example.

The substrate to which the paint of this example had been applied as described above was heated at 200° C. for 2 hours, followed by polymerization by an ester exchange reaction to form a network-shaped structure. FIG. 6 shows an electron micrograph of this structure. As shown in FIG. 6, the multi-wall carbon nanotubes 5 are cross-linked by the single-wall carbon nanotubes 6 for combination. Furthermore, this structure was evaluated for electric conductivity by a two-probe method.

Comparative Example

An electric conductivity of the multi-wall carbon nanotube structure which had been subjected to steps up to the first cross-linking step was also measured as a comparative example. The result is shown below.
This Example: 21.4 S/cm
Comparative Example: 10.1 S/cm The electric conductivity of the carbon nanotube composite structure of this example increased to be about twice as high as that of the multi-wall carbon nanotube structure of the comparative example by filling gaps in a multi-wall carbon nanotube structure with single-wall carbon nanotubes.

The carbon nanotube composite structure of this example is expected to find use in various applications such as electric and electronic and/or molding materials.

As described above, according to the present invention, obtained is the carbon nanotube structure which is excellent in thermal or electric conductivity or in mechanical characteristics, and is dense in which bonding between carbon nanotubes is formed with reliability, so that characteristics of a carbon nanotube can be effectively utilized.

What is claimed is:

1. A method of manufacturing a carbon nanotube composite structure comprising:
    supplying a first solution containing plural first carbon nanotubes having functional groups to a surface of a substrate;
    cross-linking the plural first carbon nanotubes with the functional groups to form a cured cross-linked first carbon nanotube structure;
    supplying a second solution containing plural second carbon nanotubes having functional groups to the cured cross-linked first carbon nanotube structure and penetrating the second solution into the cured cross-linked first carbon nanotube structure; and
    cross-linking the plural second carbon nanotubes with the functional groups in the second solution to form a cross-linked carbon nanotube composite structure.

2. The method of claim 1, wherein an average diameter of the carbon nanotubes in the first solution is different from an average diameter of the carbon nanotubes in the second solution.

3. A method of manufacturing a carbon nanotube composite structure according to claim 1, wherein main carbon nanotubes in the first solution are multi-wall carbon nanotubes, and main carbon nanotubes in the second solution are single-wall carbon nanotubes.

4. The method of claim 1, wherein:
    at least one of the first solution and the second solution contains a cross-linking agent that cross-links the plural functional groups together; and
    the cross-linking agent is not self-polymerizable.

5. The method of claim 4, wherein:
    each of the functional groups in at least one of the first solution and the second solution is at least one functional group selected from the group consisting of —OH, —COOH, —COOR (where R represents a substituted or unsubstituted hydrocarbon group), —COX (where X represents a halogen atom), —NH$_2$, and —NCO; and
    the cross-linking agent is capable of prompting a cross-linking reaction with the selected functional groups.

6. The method of claim 4, wherein:
the cross-linking agent is at least one cross-linking agent selected from the group consisting of a polyol, a polyamine, a polycarboxylic acid, a polycarboxylate, a polycarboxylic acid halide, a polycarbodiimide, and a polyisocyanate; and
each of the functional groups in at least one of the first solution and the second solution is capable of prompting a cross-linking reaction with the selected cross-linking agent.

7. The method of claim 4, wherein:
each of the functional groups in at least one of the first solution and the second solution is at least one functional group selected from the group consisting of —OH, —COOH, —COOR (where R represents a substituted or unsubstituted hydrocarbon group), —COX (where X represents a halogen atom), —NH$_2$, and —NCO;
the cross-linking agent is at least one cross-linking agent selected from the group consisting of a polyol, a polyamine, a polycarboxylic acid, a polycarboxylate, a polycarboxylic acid halide, a polycarbodiimide, and a polyisocyanate; and
the functional groups and the cross-linking agents are respectively selected for a combination capable of prompting a mutual cross-linking reaction.

8. The method of claim 5, wherein each of the functional groups is —COOR (where R represents a substituted or unsubstituted hydrocarbon group).

9. The method of claim 8, wherein the cross-linking agent is a polyol.

10. The method of claim 8, wherein the cross-linking agent is at least one cross-linking agent selected from the group consisting of glycerin, ethylene glycol, butenediol, hexynediol, hydroquinone, and naphthalenediol.

11. The method of claim 1, wherein at least one of the first solution and the second solution further contains a solvent.

12. The method of claim 4, wherein the cross-linking agent also functions as a solvent.

13. The method of claim 1, wherein a reaction forming the chemical bonding in at least one of the first cross-linking step and the second cross-linking step is a reaction for chemically bonding the plural functional groups of a same type.

14. The method of claim 13, wherein at least one of the first solution and the second solution further contains an additive that forms the chemical bonding among the plural functional groups of a same type.

15. The method of claim 14, wherein the reaction is dehydration condensation and the additive is a condensation agent.

16. The method of claim 15, wherein each of the functional groups is at least one functional group selected from the group consisting of —COOR (where R represents a substituted or unsubstituted hydrocarbon group), —COOH, —COX (where X represents a halogen atom), —OH, —CHO—, and —NH$_2$.

17. The method of claim 16, wherein each of the functional groups is —COOH.

18. The method of claim 15, wherein the condensation agent is at least one condensation agent selected from the group consisting of sulfuric acid, N-ethyl-N'-(3-dimethylaminopropyl)carbodiimide, and dicyclohexyl carbodiimide.

19. The method of claim 14, wherein the reaction is a substitution reaction and the additive is a base.

20. The method of claim 19, wherein each of the functional groups is at least one functional group selected from the group consisting of —NH$_2$, —X (where X represents a halogen atom), —SH, —OH, —OSO$_2$CH$_3$, and —OSO$_2$(C$_6$H$_4$)CH$_3$.

21. The method of claim 19, wherein the base is at least one base selected from the group consisting of sodium hydroxide, potassium hydroxide, pyridine, and sodium ethoxide.

22. The method of claim 13, wherein the reaction is an addition reaction.

23. The method of claim 22, wherein each of the functional groups is at least one functional group selected from the group consisting of —OH and —NCO.

24. The method of claim 13, wherein the reaction is an oxidative reaction.

25. The method of claim 24, wherein each of the functional groups is —SH.

26. The method of claim 24, wherein the solution further contains an oxidative reaction accelerator.

27. The method of claim 26, wherein the oxidative reaction accelerator is iodine.

* * * * *